United States Patent
Vivanco et al.

(10) Patent No.: US 9,037,150 B1
(45) Date of Patent: May 19, 2015

(54) LOAD MANAGEMENT IN A WIRELESS COMMUNICATION SYSTEM

(71) Applicant: Sprint Spectrum LP, Overland Park, KS (US)

(72) Inventors: Daniel Vivanco, Sterling, VA (US); Krishna Sitaram, Chantilly, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 152 days.

(21) Appl. No.: 13/856,172

(22) Filed: Apr. 3, 2013

(51) Int. Cl.
  *H04W 72/00* (2009.01)
  *H04W 72/04* (2009.01)

(52) U.S. Cl.
  CPC .................................. *H04W 72/0486* (2013.01)

(58) Field of Classification Search
  None
  See application file for complete search history.

(56) References Cited

U.S. PATENT DOCUMENTS

| | | | |
|---|---|---|---|
| 6,577,871 B1* | 6/2003 | Budka et al. | 455/453 |
| 8,150,365 B2 | 4/2012 | Chen et al. | |
| 8,284,682 B2 | 10/2012 | Huq et al. | |
| 2013/0079009 A1* | 3/2013 | Aumann et al. | 455/436 |
| 2013/0311622 A1* | 11/2013 | Das Gupta et al. | 709/221 |

* cited by examiner

*Primary Examiner* — Charles Appiah
*Assistant Examiner* — Margaret G Mastrodonato

(57) ABSTRACT

A paging message is received and determined to be an alert message intended for a tracking area. Numbers of wireless devices comprising an active connection over a first channel and over a second channel in the tracking area are determined. A number of wireless devices which will respond to the alert message over the first channel and the second channel is determined based on the number of wireless devices comprising an active connection the access node on the first and second channels and a total number of connections in the tracking area. At least one wireless device comprising an active connection over the first channel is instructed to communicate over the second channel before the alert message is sent to the tracking area based on the estimated number of wireless device which will respond to the alert message over the first channel and the second channel.

15 Claims, 5 Drawing Sheets

LOAD MANAGEMENT IN A WIRELESS COMMUNICATION SYSTEM

TECHNICAL BACKGROUND

Wireless devices can enter a low power or idle mode to preserve battery power, and while in idle mode the wireless device can periodically check an access node broadcast to determine if a call or any data is pending delivery to the wireless device. A communication system typically notifies a wireless device of pending data or an incoming call through a paging message sent to the wireless device from at least one access node. A wireless device may receive a paging message related to many possible applications running on the wireless device, for example, voice over internet protocol (VoIP), instant messaging, text messaging, email, weather alerts, traffic alerts, and the like.

When a wireless device receives a paging message, the wireless device may exit idle mode and request an active communication channel with an access node. Where a number of wireless devices request an active communication channel in a relatively short time, a greater demand is placed on wireless communication resources and other network resources (such as processing load, backhaul resource demand, and so forth).

Overview

A paging message is received and is determined to be an alert message intended for a tracking area. A number of wireless devices comprising an active connection over a first channel in the tracking area is determined, and a number of wireless devices comprising an active connection over a second channel in the tracking area is also determined. A number of wireless devices which will respond to the alert message over the first channel and the second channel is estimated based on the number of wireless devices comprising an active connection the access node on the first and second channels and a total number of connections in the tracking area. At least one wireless device comprising an active connection over the first channel is instructed to communicate over the second channel before the alert message is sent to the tracking area based on the estimated number of wireless device which will respond to the alert message over the first channel and the second channel.

DETAILED DESCRIPTION

Figure 1:
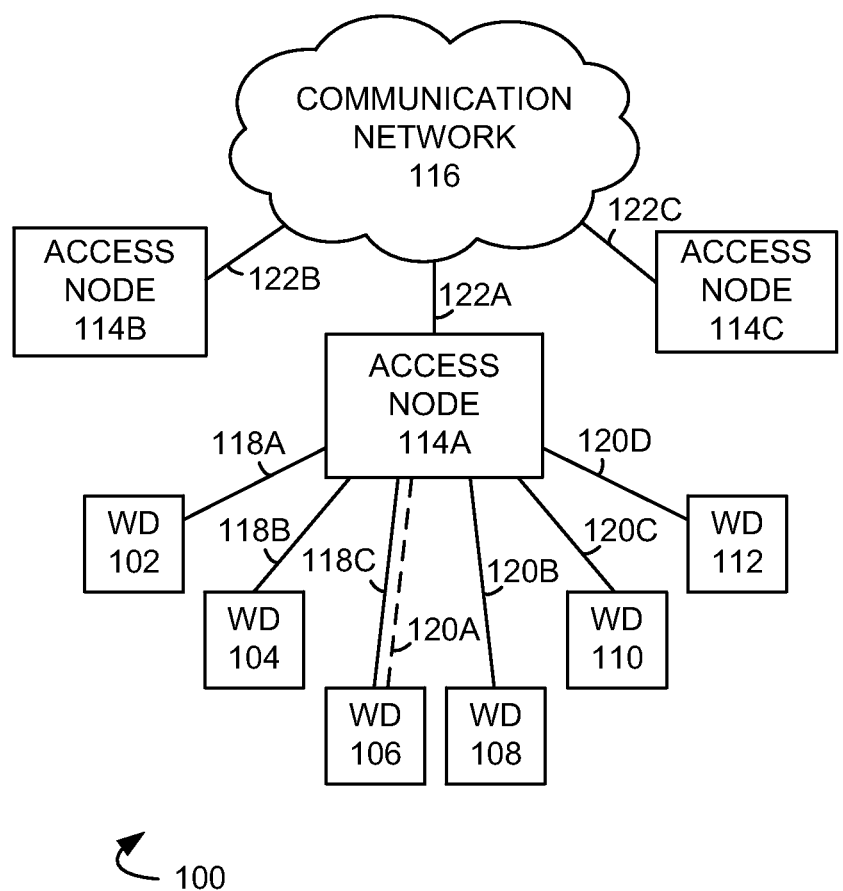
FIG. 1 illustrates an exemplary system of load management in a wireless communication system to search data stored on a wireless device.

FIG. 1 illustrates an exemplary communication system 100 of load management in a wireless communication system comprising wireless devices 102, 104, 106, 108, 110, and 112, access nodes 114A, 114B and 114C, and communication network 116. Examples of wireless devices 102-112 can comprise a cell phone, a smart phone, a computing platform such as a laptop, palmtop, or tablet, a personal digital assistant, or an internet access device, including combinations thereof. Wireless devices 102, 104 and 106 can communicate with access node 114A over communication links 118A, 118B and 118C, respectively. Communication link 118 can correspond to a first communication channel of access node 114A. Wireless devices 108, 110 and 112 can communicate with access node 114A over communication links 120B, 120C, and 120D, respectively. Communication link 120 can correspond to a second communication channel of access node 114A. Each wireless device can also be capable of communicating with access node 114A over the first and the second channel, for example, as is illustrated with regard to wireless device 106. A channel can comprise a logical communication link carried by a physical communication link.

Access nodes 114A, 114B and 114C are each a network node capable of providing wireless communications to wireless devices 102-112, and can be, for example, a base transceiver station, a radio base station, an eNodeB device, or an enhanced eNodeB device. Access node 114A is in communication with communication network 116 over communication link 122A. Access node 114A can provide wireless communications over one or more channels, such as first channel 118 and second channel 120. Similar to access node 114A, each of access nodes 114B and 114C may also provide wireless communications over at least first channel 118 and second channel 120 to one or more wireless devices (not illustrated). A plurality of access nodes (such as access nodes 114A, 114B and 114C) may be organized into a group, such as a tracking area, for purposes of sending a paging message to a wireless device which does not respond to a paging message sent to a single access node with which a wireless device was last in active communication. Access nodes belonging to a tracking area can be identified with a unique group identified, such as a tracking area code.

Communication network 116 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 110 can be capable of carrying information, for example, to support voice and data communications by a wireless device such as wireless devices 102-112. Wireless network protocols may comprise code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication network 116 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 116 may also comprise additional base stations, controller nodes, telephony switches, internet routers, network gateways, computer systems, communication links, or some other type of communication equipment, and combinations thereof.

Communication links 118, 120 and 122 can be wired or wireless communication links. Wired communication links can comprise, for example, twisted pair cable, coaxial cable or fiber optic cable, or combinations thereof. Wireless communication links can comprise a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used.

Other network elements may be present in communication system 100 to facilitate wireless communication but are omitted for clarity, such as base stations, base station controllers, gateways, mobile switching centers, dispatch application processors, and location registers such as a home location register or visitor location register. Furthermore, other network elements may be present to facilitate communication between access node 114 and communication network 116 which are omitted for clarity, including additional processing nodes, routers, gateways, and physical and/or wireless data links for carrying data among the various network elements.

Wireless devices 102-112 can enter a low power mode or idle mode in which a wireless device is not in active communication with access node 114. When a message is sent to one or more of wireless devices 102-112, the message can be buffered at a network element and a paging message can be sent to the target wireless device. In an embodiment, the paging message can be sent to the access node at which the target wireless device was last in active communication. If the wireless device does not respond to the paging message, a second paging message can be sent to a group of access nodes including the last known access node, such as a tracking area.

Wireless devices 102-112 can receive messages related to many possible applications running on the wireless device, for example, voice over internet protocol (VoIP), instant messaging, text messaging, email, weather alerts, traffic alerts, and the like. Certain messages can be sent to a plurality of wireless devices at substantially the same time or within a narrow time interval. Examples of such messages include weather alerts, emergency road condition alerts, campus security alerts (as may be sent, for example, by a university to students), emergency news alerts, and the like, referred to generally herein as "alert messages". Because of the importance or timeliness of the content of alert messages, and because of the potentially large number of target wireless devices to which an alert message is sent, alert messages may cause a large number of wireless devices which are in idle mode to exit the idle mode and request active communication channels with an access node, generating a sudden large demand for wireless communication resources and other network resources (such as processing load, backhaul resource demand, and so forth).

Figure 2:
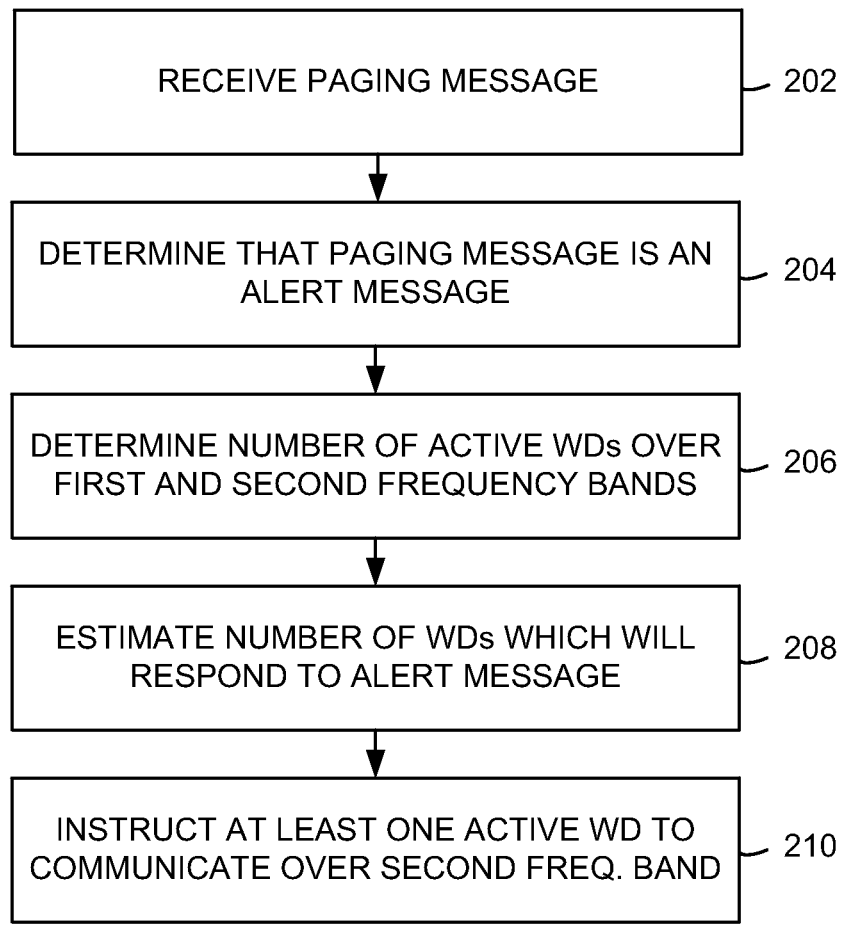
FIG. 2 illustrates an exemplary method of load management in a wireless communication system to search data stored on a wireless device.

In operation, a paging message is received at a processing node and it is determined that the paging message is an alert message intended for a tracking area, which can comprise access nodes 114A, 114B and 114C. A number of wireless devices comprising an active connection over a first channel in the tracking area is determined from among wireless devices 102-106, and a number of wireless devices comprising an active connection over a second channel in the tracking area is also determined from among wireless devices 108-112. An estimation is calculated of a number of wireless devices which will respond to the alert message over the first channel and the second channel based on the number of wireless devices comprising an active connection the access node on the first and second channels and a total number of connections in the tracking area. Based on the estimated number of wireless device which will respond to the alert message over the first channel and the second channel, at least one wireless device comprising an active connection over the first channel is instructed communicate over the second channel before the alert message is sent to the tracking area FIG. 2 illustrates an exemplary method of load management in a wireless communication system to search data stored on a wireless device. In operation 202, a paging message is received at a processing node, and in operation 204 it is determined that the paging message is an alert message intended for a tracking area. For example, a paging message can be received and it can be determined that the paging message comprises an alert message which is intended for wireless devices 102-112 in the tracking area comprising access nodes 114A-114C.

The paging message can be determined to be an alert message, for example, by deep packet inspection of the paging message. Deep packet inspection typically (DPI) involves the examination of a data payload of a packet in addition to packet headers and protocol structure. In an embodiment, deep packet inspection includes looking beyond Open Systems Interconnection (OSI) layer 3 of packets. DPI can determine, among other things, whether the paging message is intended for a single wireless device, for a plurality of wireless devices, for general broadcast, and the like. In an embodiment, when a paging message is intended for a threshold number of wireless devices, it can be identified as an alert message. In an embodiment, DPI can examine a paging message for an indication that the paging message is an alert message. Such an indication can comprise, for example, a header bit which is set to indicate that the paging message is an alert message. The indication can also comprise, for example, a bit in the payload portion of the paging message which is set to indicate that the paging message is an alert message. The indication can also comprise text within a payload of the paging message which comprises the text "alert", "warning", "emergency", "urgent," "update", and the like. Other text may also be present which is related to the nature of the alert, such as "weather," "traffic," "accident," "safety," "security," and the like. Other text may also comprise an indication that the paging message is an alert message, and the examples provided herein are merely exemplary and are not exhaustive. Further, combinations of the foregoing are also possible. As but one example, a paging message which is determined to be intended for a threshold number of target wireless devices and comprises an indication that it is an alert message can be identified as an alert message.

In operation 206, a number of wireless devices comprising an active connection over a first channel in the tracking area, and a number of wireless devices comprising an active connection over a second channel in the tracking area are determined. For example, within the tracking area comprising access nodes 114A-114C, it can be determined that wireless device 102 is in idle mode, and that wireless devices 104 and 106 are in active communication with access node 114A over first channel 118, and thus 2 wireless devices are in communication with access node 114A over an connection. In addition, it can be determined that, for example, wireless devices 108 and 110 are in idle mode, and that wireless device 112 is in active communication with access node 114A over second channel 120, and thus 1 wireless device is in communication with access node 114A over an active connection.

In operation 208, an estimation is made of a number of wireless devices which will respond to the alert message over the first channel and the second channel based on the number of wireless devices comprising an active connection the access node on the first and second channels and a total number of connections in the tracking area. For example, access nodes 114A, 114B, and 114C each can provide a number of wireless devices with which they are in active communication. Further, a network element of communication system 100 also can maintain a number of wireless devices which are in idle mode and which were last in active communication with one of access nodes 114A, 114B or 114C. These determinations can be made for each access node in the tracking area (e.g., access nodes 114A, 114B, and 114C), and can be made for each channel of each access node (e.g., channels 118 and 120 of access node 114A, as well as corresponding channels of access nodes 114B and 114C). Moreover, each access node also capable of supporting a maximum number of active connections. Based on the number of wireless devices comprising an active connection the access node on the first and second channels and a total number of connections in the tracking area, an estimation is made of a number of wireless devices which will respond to the alert message over the first channel and the second channel.

In operation 210, at least one wireless device comprising an active connection over the first channel is instructed to communicate over the second channel before the alert message is sent to the tracking area based on the estimated number of wireless device which will respond to the alert message over the first channel and the second channel. For example, when it is determined that a greater number of wireless devices will respond to an alert message over the first channel, then over the second channel, wireless device 106 (which is in active communication with access node 114A over first channel 118) can be instructed to communicate with access node 114A over second channel 120A before the alert message is sent to the tracking area. Instructing a wireless device which is in active communication with an access node to communicate over the second channel before the alert message is sent enables communication system 100 to balance an load which is anticipated when wireless devices in idle mode respond to the alert message. While it is also possible to balance the load caused by wireless devices exiting idle mode as those wireless devices request a channel and communication resources, instructing wireless devices in active communication with the access node to switch channels before the alert message is sent reduces the amount of load balancing which must occur after the alert message is sent, and furthermore enables the communication system to free up channel resources for a greater number of wireless devices.

Figure 3:
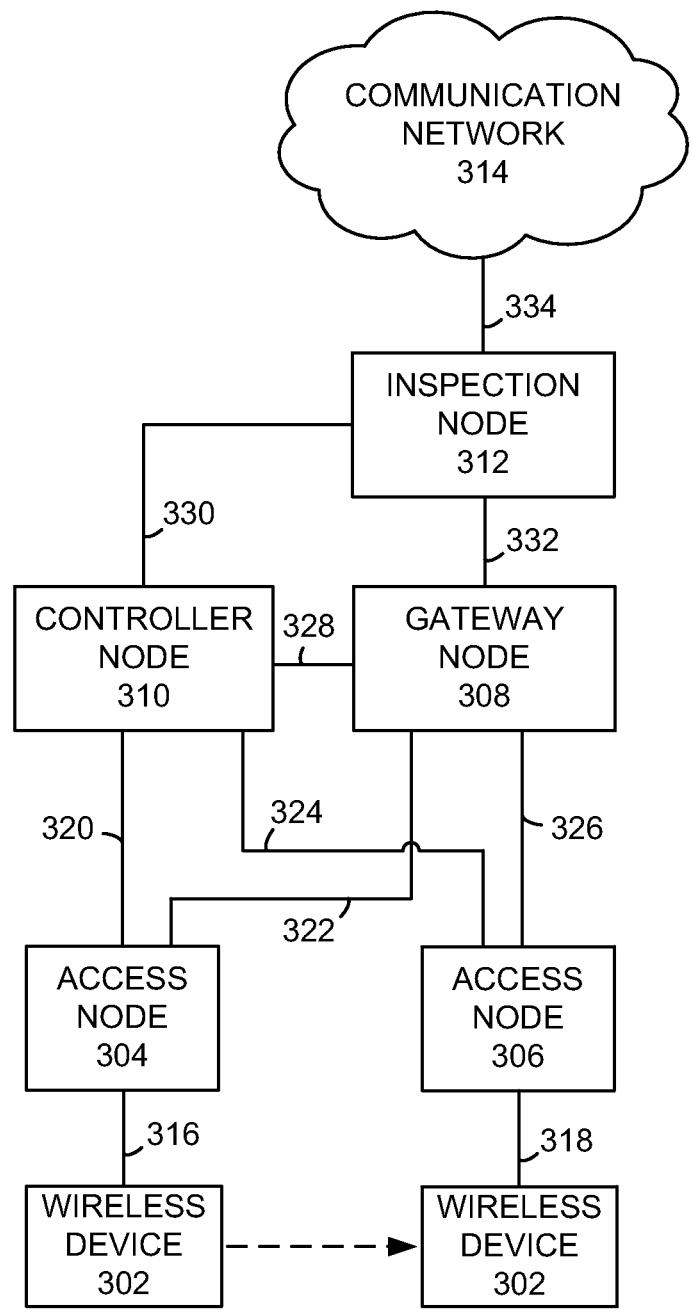
FIG. 3 illustrates another exemplary system of load management in a wireless communication system to search data stored on a wireless device.

FIG. 3 illustrates another exemplary system 300 of load management in a wireless communication system comprising wireless device 302, access nodes 304 and 306, gateway node 308, controller node 310, inspection node 312, and communication network 314. Examples of wireless device 302 can include a cell phone, a smart phone, a computing platform such as a laptop, palmtop, or tablet, a personal digital assistant, or an internet access device, including combinations thereof. Wireless device 302 can communicate with access node 304 over communication link 316, and with access node 306 over communication link 318. Communication link 316 can correspond with a first channel, and communication link 318 can correspond with a second channel.

Access nodes 304 and 306 are each a network node capable of providing wireless communications to wireless device 302, and can be, for example, a base transceiver station, a radio base station, an eNodeB device, or an enhanced eNodeB device. Access nodes 304 and 306 can comprise members of a tracking area or similar group of access nodes. Access node 304 is in communication with controller node 310 over communication link 320 and with gateway node 308 over communication link 322. Access node 306 is in communication with controller node 310 over communication link 324 and with gateway node 308 over communication link 326. While only a single wireless device 302 is illustrated for brevity, this is merely exemplary, and access nodes 304 and 306 can each communicate with a plurality of wireless devices.

Gateway node 308 is a network element which can comprise a processor and associated circuitry to execute or direct the execution of computer-readable instructions. Gateway node 308 can retrieve and execute software from storage, which can include a disk drive, flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. In an embodiment, gateway node 308 can provide instructions to access nodes 304 and 306 related to channel selection in communications with wireless device 302. In an embodiment, gateway node 308 can provide controller node 310 with an indication that gateway node 308 can be for example, a standalone computing device or network element, or the functionality of controller node 310 can be included in another network element. Gateway node 308 is in communication with controller node 310 over communication link 328 and with inspection node 312 over communication link 332.

Controller node 310 is a network element which can comprise a processor and associated circuitry to execute or direct the execution of computer-readable instructions. Controller node 310 can retrieve and execute software from storage, which can include a disk drive, flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Controller node 310 can, among other things, provide instructions related to mobility management, paging messages, and other communications with regard to wireless device 302. Controller node 310 can be, for example, a standalone computing device or network element, such as a mobility management entity (MME), or the functionality of controller node 310 can be included in another network element.

Inspection node 312 is a network element which can comprise a processor and associated circuitry to execute or direct the execution of computer-readable instructions. Inspection node 312 can retrieve and execute software from storage, which can include a disk drive, flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Inspection node 312 can, among other things, perform deep packet inspection of packets sent from and/or to wireless device 302. Deep packet inspection generally involves an inspection of packets beyond Open Systems Interconnection (OSI) layer 3 including an inspection of the data portion of a packet (and possibly also the header of a packet). Inspection node 312 can be for example, a standalone computing device or network element, or the functionality of mode inspection node 312 can be included in another network element, such as a mobility management entity (MME), a gateway, a proxy node, or another network element. While FIG. 3 illustrates inspection node 312 interposed between communication network 314, gateway node 308 and controller node 310, this is merely exemplary, and alternative communication paths are also possible.

For example, inspection node 312 can also be in communication with gateway node 308 and/or controller node 310, and gateway node 308 and controller node 310 can be in communication with communication network 314 directly. Other communication pathways are also possible, including combinations of the foregoing.

Communication network 314 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 314 may also comprise base stations, wireless communication nodes, telephony switches, internet routers, network gateways, computer systems, communication links, or some other type of communication equipment, and combinations thereof. Wireless network protocols may comprise code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication network 314 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM).

Communication links 316, 318, 320, 322, 324, 326, 328, 330, 332 and 334 can be wired or wireless communication links. Wired communication links can be, for example, twisted pair cable, coaxial cable or fiber optic cable, or combinations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used.

Other network elements may be present in the communication system 300 to facilitate wireless communication but are omitted for clarity, such as base stations, base station controllers, gateways, mobile switching centers, dispatch application processors, and location registers such as a home location register or visitor location register. Furthermore, other network elements may be present to facilitate communication among access nodes 304 and 306, gateway node 308, controller node 310, and communication network 314 which are omitted for clarity, including additional processing nodes, routers, gateways, and physical and/or wireless data links for carrying data among the various network elements.

Figure 4:
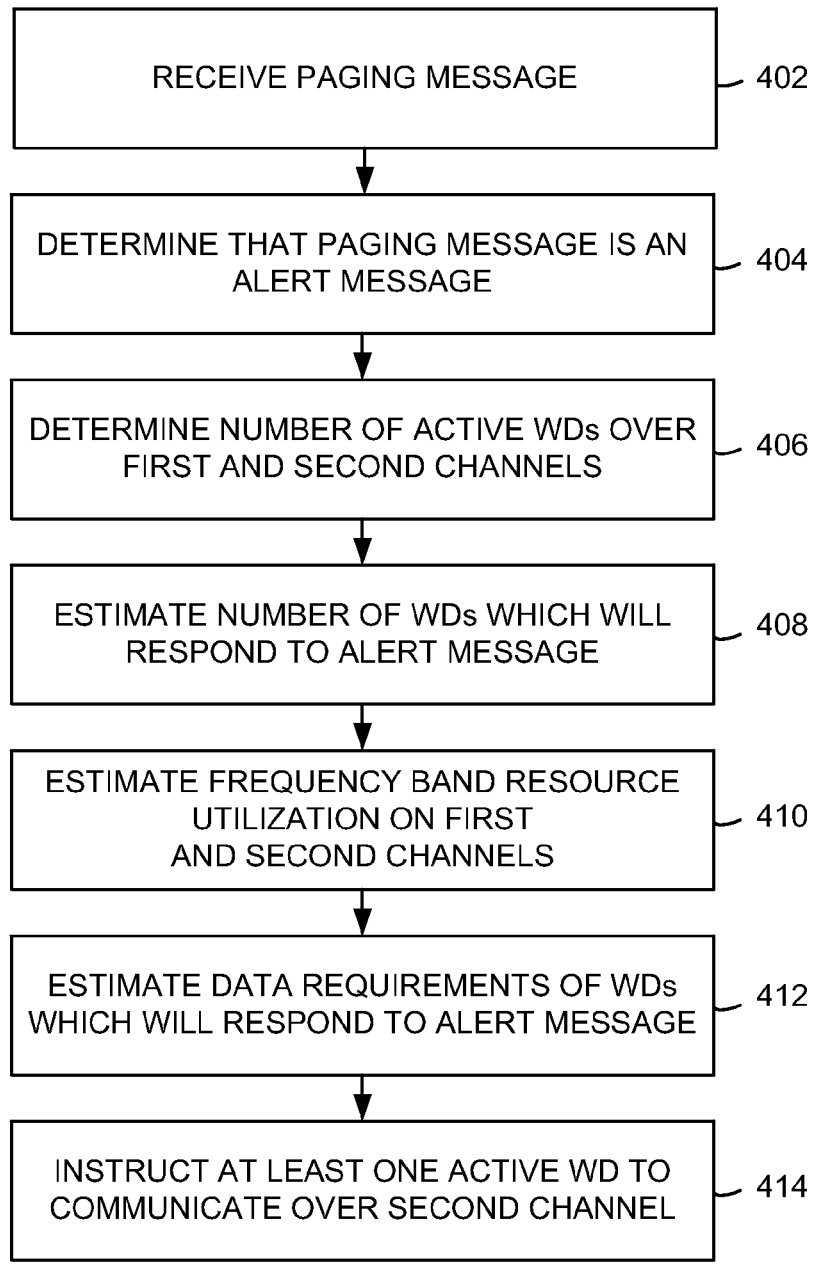
FIG. 4 illustrates another exemplary method of load management in a wireless communication system to search data stored on a wireless device.

FIG. 4 illustrates another exemplary method of load management in a wireless communication system to search data stored on a wireless device. In operation 402, a paging message is received, and in operation 404 it is determined that the paging message is an alert message intended for a tracking area. For example, a paging message can be received and it can be determined that the paging message comprises an alert message which is intended for wireless device 302 and other wireless devices in the tracking area comprising access nodes 304 and 306.

The paging message can be determined to be an alert message, for example, by deep packet inspection of the paging message by inspection node 312. In an embodiment, when a paging message is intended for a threshold number of wireless devices, it can be identified as an alert message. In an embodiment, DPI can examine a paging message for an indication that the paging message is an alert message. Such an indication can comprise, for example, a header bit which is set to indicate that the paging message is an alert message. The indication can also comprise, for example, a bit in the payload portion of the paging message which is set to indicate that the paging message is an alert message. The indication can also comprise text within a payload of the paging message which comprises text indicating that the paging message is an alert message. Other text may also comprise an indication that the paging message is an alert message, and the examples provided herein are merely exemplary and are not exhaustive. Further, combinations of the foregoing are also possible.

In operation 406, a number of wireless devices comprising an active connection over a first channel in the tracking area, and a number of wireless devices comprising an active connection over a second channel in the tracking area are determined. For example, within the tracking area comprising access nodes 304 and 306, it can be determined that wireless device 302 is in active communication with access node 304 over first channel 316. In addition, a number of other wireless devices (not illustrated) can be determined to be in active communication with access nodes 304 and 306.

In operation 408, an estimation is made of a number of wireless devices which will respond to the alert message over the first channel and the second channel based on the number of wireless devices comprising an active connection the access node on the first and second channels and a total number of connections in the tracking area. For example, access nodes 304 and 306 each can provide a number of wireless devices with which they are in active communication. Further, a network element such as controller node 310 can maintain a record of a number of wireless devices which are in idle mode and which were last in active communication with one of access nodes 304 or 306. These determinations can be made for each access node in the tracking area, and can be made for each channel of each access node. Moreover, each access node also capable of supporting a maximum number of active connections. Based on the number of wireless devices comprising an active connection the access node on the first and second channels and a total number of connections in the tracking area, an estimation is made of a number of wireless devices which will respond to the alert message over the first channel and the second channel.

In operation 410, an estimation is made of channel resources which will be utilized on the first and second channels by the number of wireless devices which will respond to the alert message. For example, wireless devices which are in active communication with access nodes 304 and 306 can respond to the alert message. In addition, wireless devices which are in idle mode can also respond, and each responding wireless device exiting idle mode will request a communication channel to communicate with an access node. Based on the estimated number of wireless devices which may respond to the alert message, channel resources which will be utilized on the first and second channels can be estimated. Examples of channel resources can include frequency bands, time slots, resource elements, physical resource blocks, and the like. Channel resources which will be utilized can also be estimated, for example, as a percentage of utilization of a type or types of resources. Combinations of the foregoing are also possible.

In an embodiment, the estimate of channel resources which will be utilized can be based on applications running on the wireless devices which will respond to the alert message.

Alternatively, or in additionally, in an embodiment, the estimate of channel resources which will be utilized can be based on data requirements of wireless devices which will respond to the alert message. For example, the alert message may be for a particular application such as a weather application, or a traffic information application, a video application, a voice application (such as voice over internet protocol), and the like. Application requirements of the responding application or applications can be determined, such as a minimum data rate, a maximum permitted data delay, a maximum permitted data error rate, a traffic class priority (such as a quality of service (QOS) class indicator (QCI) or similar traffic class indicator), and the like. The application requirements of the responding application can provide an indication of the channel resources which will be utilized when a wireless device responds to the alert message. Thus, the estimate of data requirements can be based on applications running on the wireless devices which will respond to the alert message. Further, the estimate of data requirements can be based on an application associated with the alert message (e.g., on an application which is explicitly associated with the alert message). In an embodiment, the estimate of channel resources which will be utilized can be based on historical information related to wireless devices which have responded to previous alert messages.

In operation 414, at least one wireless device comprising an active connection over the first channel is instructed to communicate over the second channel before the alert message is sent to the tracking area based on the estimated number of wireless device which will respond to the alert message over the first channel and the second channel. For example, when it is determined that a greater number of wireless devices will respond to an alert message over the first channel, then over the second channel, wireless device 106 (which is in active communication with access node 114A over first channel 118) can be instructed to communicate with access node 114A over second channel 120A before the alert message is sent to the tracking area.

In an embodiment, at least one wireless device comprising an active connection over the first channel can be instructed to communicate over the second channel before the alert message is sent to the tracking area based on both the estimated number of wireless device which will respond to the alert message over the first channel and the second channel, and the estimate of channel resources which will be utilized on the first and second channels by the number of wireless devices which will respond to the alert message. In an embodiment, at least one wireless device comprising an active connection over the first channel can be instructed to communicate over the second channel before the alert message is sent to the tracking area based on both the estimated number of wireless device which will respond to the alert message over the first channel, and the second channel and the estimate of data requirements of wireless devices which will respond to the alert message. For example, wireless device 302 can be instructed to change from communicating over the first channel (communication link 316) to communicating over the second channel (communication link 318). In an embodiment, the instruction can also involve the performance of a handover of wireless device 302 from access node 304 to access node 306. Combinations of the foregoing are also possible.

Figure 5:
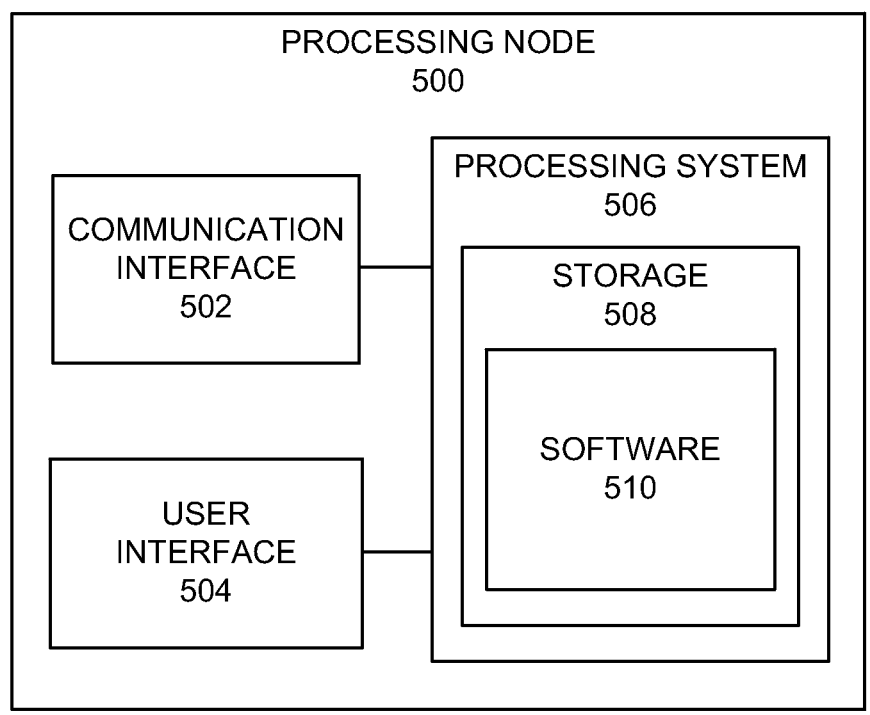
FIG. 5 illustrates an exemplary processing node.

FIG. 5 illustrates an exemplary processing node comprising communication interface 502, user interface 504, and processing system 506 in communication with communication interface 502 and user interface 504. Processing system 506 includes storage 508, which can comprise a disk drive, flash drive, memory circuitry, or other memory device. Storage 508 can store software 510 which is used in the operation of the processing node 500. Storage 508 may include a disk drive, flash drive, data storage circuitry, or some other memory apparatus. Software 510 may include computer programs, firmware, or some other form of machine-readable instructions, including an operating system, utilities, drivers, network interfaces, applications, or some other type of software. Processing system 506 may include a microprocessor and other circuitry to retrieve and execute software 510 from storage 508. Processing node 500 may further include other components such as a power management unit, a control interface unit, etc., which are omitted for clarity. Communication interface 502 permits processing node 500 to communicate with other network elements. User interface 504 permits the configuration and control of the operation of processing node 500.

Examples of processing node 500 include carrier gateway node 308 and controller node 310. Processing node 500 can also be an adjunct or component of a network element, such as an element of controller node 310, access node 304, access node 306, or access node 114A. Processing node 500 can also be another network element in a communication system. Further, the functionality of processing node 500 can be distributed over two or more network elements.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of load management in a wireless communication system, comprising:
   receiving a paging message at a processing node and determining that the paging message is an alert message intended for a tracking area;
   determining a number of active wireless devices connected to an access node over a first channel in the tracking area;

determining a number of active wireless devices connected to the access node over a second channel in the tracking area;

estimating a total number of wireless devices in the tracking area that will respond to the alert message over the first channel and the second channel, wherein the total number is based on the number of active wireless devices connected to the access node over the first channel and the second channel and an estimated number of idle wireless devices located in the tracking area;

determining applications running on the wireless devices estimated to respond to the alert message over the first channel and the second channel;

estimating, based on the determined applications, consumption of first channel resources and second channel resources by the wireless devices in the tracking area; and instructing, based on the determined application and estimated consumption of channel resources, at least one active wireless device connected to the access node over the first channel to communicate over the second channel before the alert message is sent to the tracking area.

2. The method of claim 1, wherein the determined applications are associated with the alert message.

3. The method of claim 1, wherein the estimated consumption of channel resources is further based on historical information related to wireless devices that have responded to previous alert messages.

4. The method of claim 1, further comprising:

estimating data requirements of the wireless devices estimated to respond to the alert message; and instructing, based on the estimated data requirements, at least one active wireless device connected to the access node over the first channel to communicate over the second channel before the alert message is sent to the tracking area.

5. The method of claim 4, wherein the estimated data requirements are based on the applications running on the wireless devices that will respond to the alert message.

6. The method of claim 4, wherein the estimated data requirements are based on an application associated with the alert message.

7. The method of claim 4, wherein the estimated data requirements are based on historical information related to wireless devices that have responded to previous alert messages.

8. The method of claim 1, wherein the first channel is a channel of a first access node in the tracking area and the second channel is a channel of a second access node in the tracking area.

9. A system of load management in a wireless communication system comprising:

a processing node configured to:

receive a paging message at a processing node and determine that the paging message is an alert message intended for a tracking area;

determine a number of active wireless devices connected to an access node over a first channel in the tracking area;

determine a number of active wireless devices connected to the access node over a second channel in the tracking area;

estimate a total number of wireless devices in the tracking area that will respond to the alert message over the first channel and the second channel, wherein the total number is based on the number of active wireless devices connected to the access node over the first channel and the second channel and an estimated number of idle wireless devices located in the tracking area;

determine applications running on the wireless devices estimated to respond to the alert message over the first channel and the second channel;

estimate, based on the determined application, consumption of first channel resources and second channel resources by the wireless devices in the tracking area; and instruct, based on the determined application and estimated consumption of channel resources, at least one active wireless device connected to the access node over the first channel to communicate over the second channel before the alert message is sent to the tracking area.

10. The system of claim 9, wherein the determined applications are associated with the alert message.

11. The system of claim 9, wherein the estimated consumption of channel resources is further based on historical information related to wireless devices that have responded to previous alert messages.

12. The system of claim 9, wherein the processing node is further configured to:

estimate data requirements of wireless devices estimated to respond to the alert message; and instruct, based on the estimated data requirements, at least one active wireless device connected to the access node over the first channel to communicate over the second channel before the alert message is sent to the tracking area.

13. The method of claim 12, wherein the estimated data requirements are based on the applications running on the wireless devices that will respond to the alert message.

14. The method of claim 12, wherein the estimated data requirements are based on an application associated with the alert message.

15. The method of claim 12, wherein the estimated data requirements are based on historical information related to wireless devices that have responded to previous alert messages.

* * * * *